United States Patent [19]

Charchian et al.

[11] 4,291,795

[45] Sep. 29, 1981

[54] COUPLING LUBRICATION SYSTEM

[76] Inventors: Loris J. Charchian, 2540 Somerset Blvd., Troy, Mich. 48084; Donald O. Emmons, 24323 Pinecrest, Novi, Mich. 48050; Thaddeus F. Zlotek, 23601 Hoover Rd., Warren, Mich. 48089

[21] Appl. No.: 13,959

[22] Filed: Feb. 22, 1979

[51] Int. Cl.³ .............................................. F16D 13/74
[52] U.S. Cl. ................................ 192/113 B; 192/45.1
[58] Field of Search ................ 192/58 C, 45.1, 113 B, 192/58 B; 184/11 R, 11 A, 11 B, 11 C, 11 D; 64/30 LB, 26; 188/264 E, 264 C, 264 B; 403/35, 37, 38, 39

[56] References Cited

U.S. PATENT DOCUMENTS

| | | | |
|---|---|---|---|
| 1,484,935 | 2/1924 | Dunavann | 184/11 A |
| 3,107,130 | 10/1963 | Lakey et al. | 184/11 R X |
| 3,529,698 | 9/1970 | Nelson | 184/11 A X |
| 3,750,789 | 8/1973 | Buchelt | 192/113 B |
| 3,857,462 | 12/1974 | Kaufman et al. | 184/11 A |
| 3,897,860 | 8/1975 | Borck et al. | 192/113 B |
| 4,131,188 | 12/1978 | Charchian | 192/113 B |
| 4,157,020 | 6/1979 | Young | 64/30 LB |

FOREIGN PATENT DOCUMENTS 1303816   1/1973   United Kingdom ............ 192/113 B

*Primary Examiner*—Werner H. Schroeder
*Assistant Examiner*—Andrew M. Falik
*Attorney, Agent, or Firm*—Robert M. Leonardi

[57] ABSTRACT

A backstop and standby drive coupling using a sprag-type clutch is disclosed. The coupling includes a lubrication arrangement providing oil lubrication and cooling from an external supply and internal recirculation from an internal sump. Lubrication flow paths for distributing oil to critical parts of the coupling and to control the flow of surplus oil are provided.

14 Claims, 3 Drawing Figures

COUPLING LUBRICATION SYSTEM

BACKGROUND OF THE INVENTION

There is a variety of available one way coupling designs adapted to specific needs. Such couplings typically include a rotatable member for connection with a shaft of a driven machine and at least one rotatably stationary member to prevent rotation of the rotatable member in one direction or to provide a driving connection with, for example, a standby drive under certain circumstances. Such couplings find use in a variety of applications and frequently must function under extremely adverse conditions.

Lubrication is an extremely difficult problem in some applications. Some large couplings have an external lubricant pump which operates satisfactorily as long as the pump and related equipment is functioning properly. One shortcoming with previous coupling designs using an external lubricant supply is their limited ability to operate satisfactorily when such supply is terminated. This is a serious shortcoming because loss of lubricant often occurs when the coupling is subjected to other difficult operating conditions.

Couplings having internal pumping systems have also been used to supplement or replace external pumps. Many of these designs incorporate scoops or tubes which extend into a lubricant reservoir. Efficiency problems have been created by such systems because of the rotational drag forces existant with those designs, often accompanied by unacceptable lubricant turbulence in the reservoir.

It is the object of the present invention to provide a standby and/or holdback coupling with a simple compact and efficient internal lubricant circulation system.

SUMMARY OF THE INVENTION

The above and other objects are realized in a coupling having a rotationally fixed member and a member rotatable relative to the fixed member. The drive members are engageable through a one way clutch. The rotatable member includes an annular lubricant sump and the stationary member includes a ring extending into the sump. The ring gathers lubricant from the sump for distribution within the coupling, and particularly to the coupling bearings.

DESCRIPTION OF A PREFERRED EMBODIMENT

Figure 1:
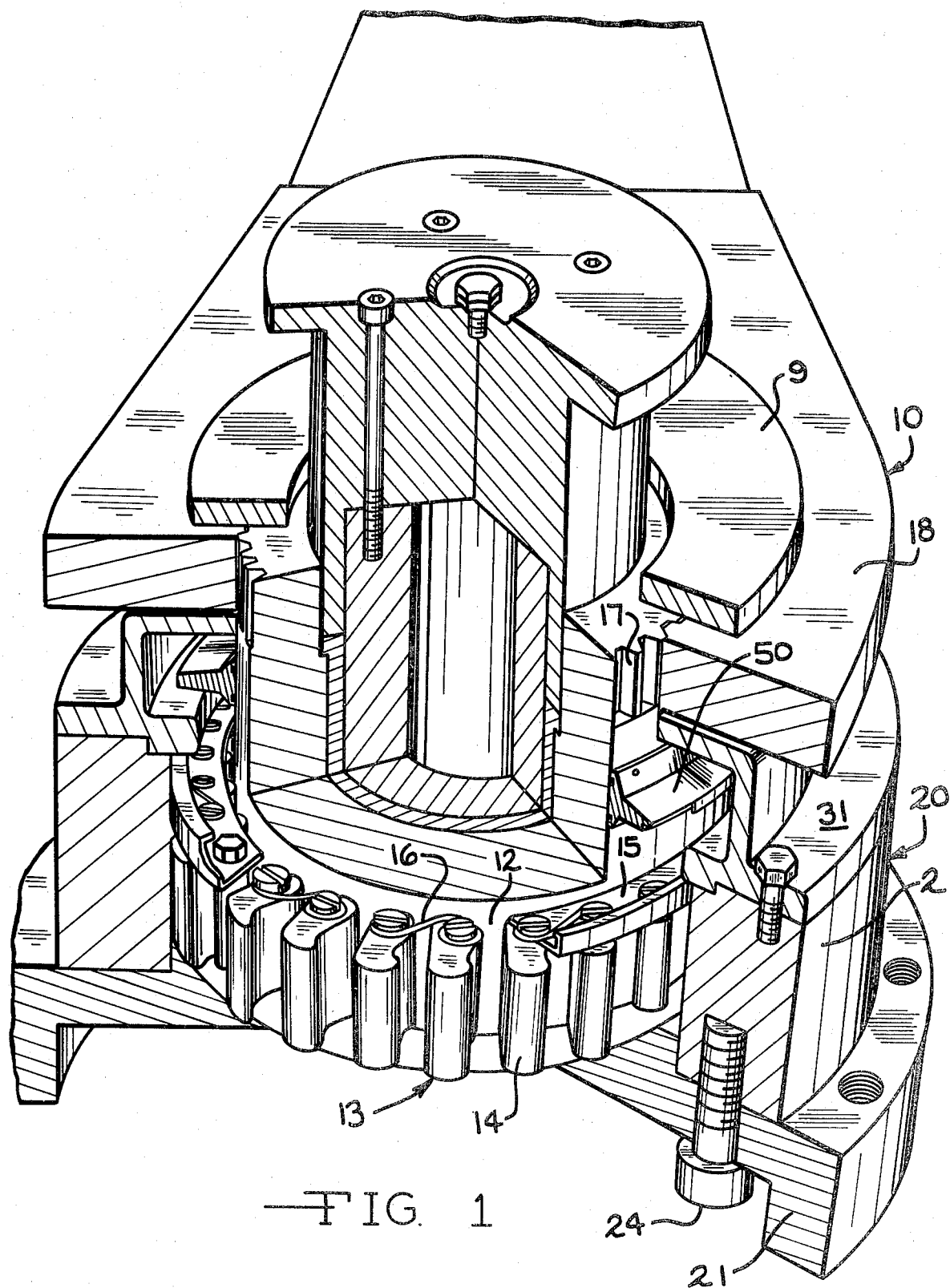
FIG. 1 is a perspective view, partially cut away, of a preferred embodiment of present invention.
Figure 2:
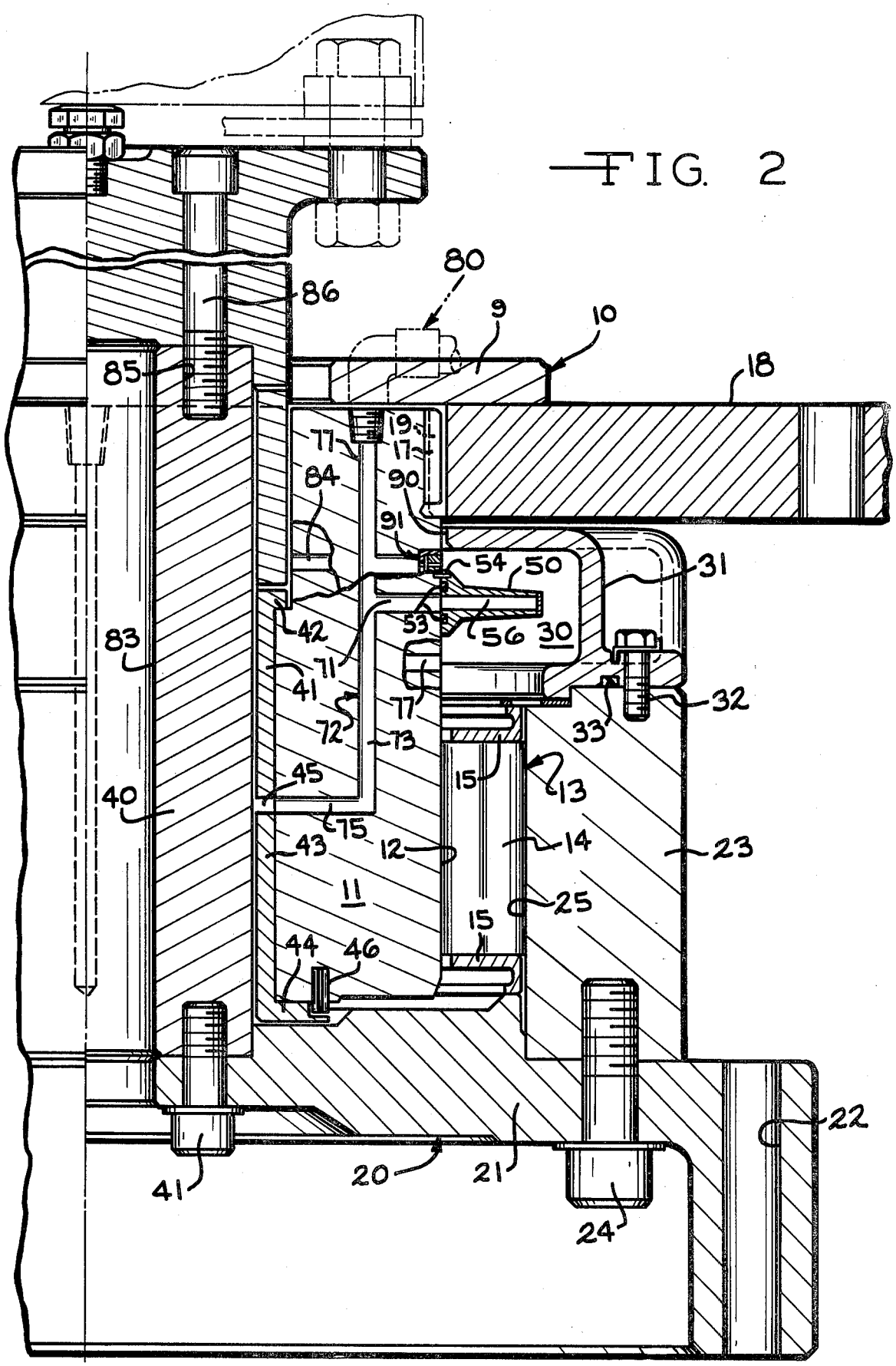
FIG. 2 is a vertical cross-sectional view of the coupling of FIG. 1 shown in its upright or operational position.

FIGS. 1 and 2 of the drawings illustrates a preferred embodiment of the coupling of the present invention for use in a combined holdback and standby drive arrangement. The coupling comprises a first member 10 fixed against rotation. The member 10 includes a generally cylindrical member 11 with a radially outer face 12 adapted for driving engagement with unidirectional driving means 13, which in a preferred embodiment is a plurality of sprags 14 mounted between a pair of axially spaced retainers 15 and resiliently located via energizing springs 16. Such arrangements are well known in the prior art, as for example U.S. Pat. No. 2,954,855, the disclosure of which is incorporated herein by reference. For the particular application illustrated it is preferred that the sprag geometry be such as to cause the sprags to disengage the surface 12 when the sprags 14 and retainers 15 are rotating, under centrifugal force. This concept is known as centrifugal throwout and is also well known in the art. Alternatively, the unidirectional drive means 13 may be another type of one-way clutch or one-way driving device. For example, one-way clutches utilizing rollers which operate in conjunction with ramps are also well known in the art.

Axially spaced from the clutching face 12 on the cylindrical member 11 is a set of external gear teeth 17. A holdback torque arm 18 is provided of suitable length and strength to hold the member 11 against rotation through the gear teeth 19 therein which drivingly engage the gear teeth 17. An annular cover plate 9 spans the gear tooth interface supporting the torque arm 18.

The coupling includes a rotatable member 20 with a disc-like member 21 having holes 22 for securing the coupling to a rotating device such as; for example, an electric motor. A cylindrical member 23 is affixed to the base 21 by any suitable means such as bolts 24. The radially inner surface 25 is adjacent the sprags 14 and, through it, is in one-way driving relationship with the stationary member 10. The rotatable member 20 includes a lubricant sump 30 above and generally radially aligned with the clutch 13. The sump is partially defined by an annular, inwardly concave and sealed, "U" shaped member 31 secured to the cylinder 23 by bolts 32 and an "O" ring 33. It should be noted that alternatively the positions of the clutch 13 and sump 30 may be reversed; i.e., the clutch 13 may be located above the sump 30 as viewed in FIG. 2.

A second cylindrical member 40 is secured to the base 21 by bolts 41, thereby forming an overall rotational member 20 which is generally "U" shaped and surrounds the stationary member 11 and clutch 13 on three sides and serves to retain the lubricant within the clutch. A bearing 41 is disposed between the members 11 and 40 to facilitate relative rotation therebetween. The bearing 41 includes a shoulder 42 for proper axial positioning. A second bearing 43 is axially aligned with the first and includes a shoulder 44. The shoulder 44 serves as a thrust bearing to transmit axial forces between the members 11 and 21 and to axially locate the bearing 43 relative to the bearing 41 to provide a space 45 therebetween. The bearings 41 and 43 are shrink-fitted to positively fix their relative axial positions. In addition, the bearing 43 is held against rotation relative to the member 11 by a pin 46.

The inner member 40 of the coupling, in one preferred embodiment, includes a plurality of tapped holes 85 for use in connecting to it, via bolts 86 an adapter of any desirable design for connection to a drive means. Ordinarily this will be an alternate or standby drive which may include an additional one-way clutch.

Under normal conditions lubricant is supplied to critical parts of the coupling from an external supply through the fitting 80 and passageway 77.

Figure 3:
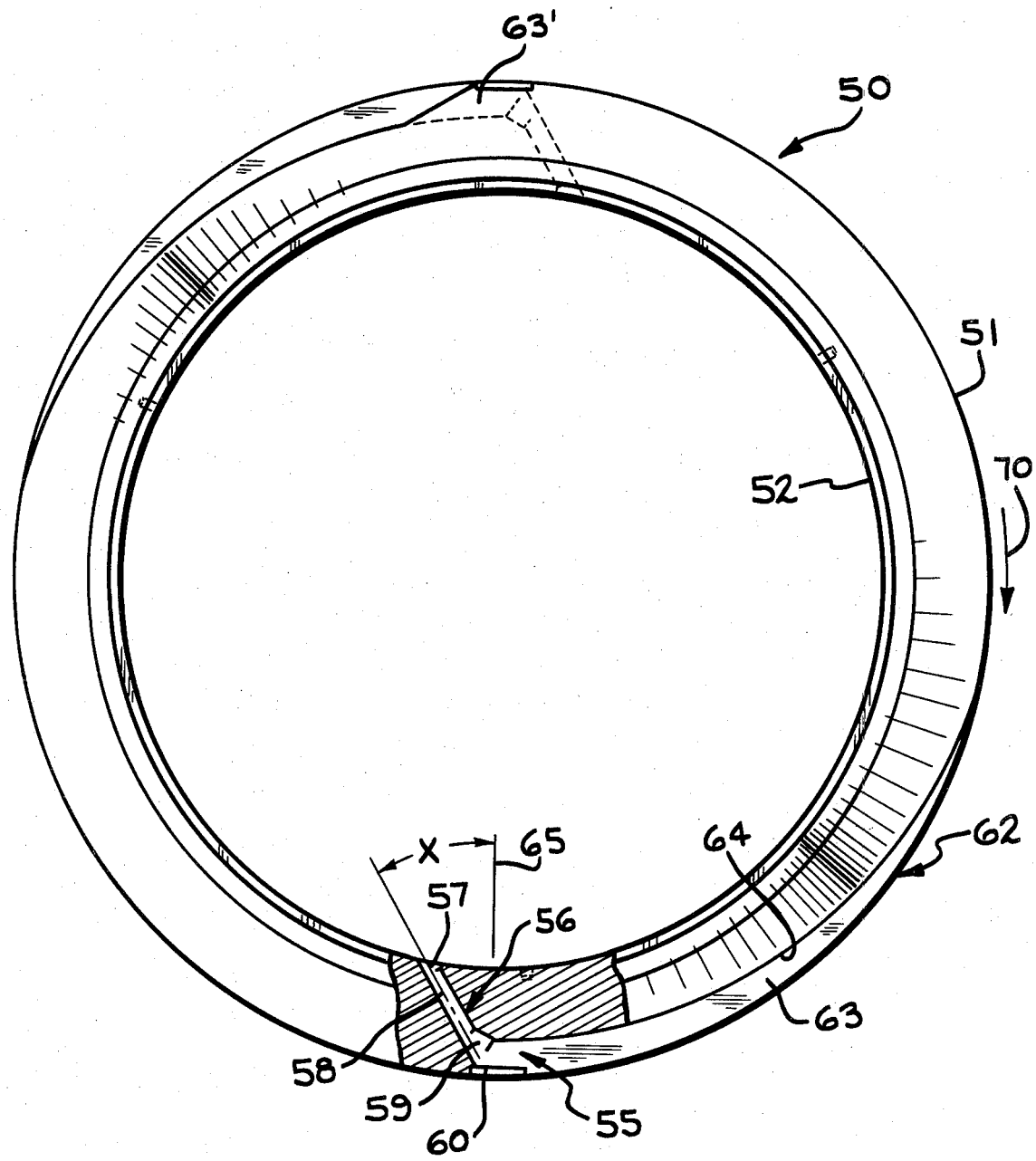
FIG. 3 is a bottom plan view, partially cut away, of the lubricant ring, shown in FIGS. 1 and 2.

As most clearly seen in FIG. 2, a lubrication ring 50 is rigidly affixed to the stationary cylindrical member 11 by three equally circumferentially spaced pins 54 (FIG. 3). Alternatively screws or other mechanical methods or devices may be used to secure ring 50 to the member 11. The ring 50 is positioned above the one-way clutch 13 as viewed in FIG. 2 and extends radially into the lubricant sump 30. The radially inner surface 52 of the ring fits flush against the radially outer surface 12 of the stationary member 11. Two axially spaced O-rings 53 seal the ring 50 to the member 11. The ring 50 has a hydrodynamically shaped cross-section to reduce drag and turbulence in the sump 30.

Referring to FIG. 3, the lubrication ring 50 has a radially outer surface 51 into which are provided two equally circumferentially spaced flush inlets 55. Alternatively, the ring may be provided with one or more inlets such as 55, depending upon the lubrication requirements, size, etc. of a particular device. It should be noted that the inlets 55 include no scoops or other projections extending beyond the radially outer surface 51, which can increase drag and turbulence within the sump 30. The flush inlets 55 comprise a tapered "L" shaped entry 62 which in a preferred embodiment, circumferentially extends about 90° around the outer surface 51 of the ring. The length of the entry may vary in other applications depending upon anticipated rotational speed of the device, the number of inlets, etc. The entry 62 is defined by a radially extending guide wall or "fence" 63 which defines the upper side of the entry, and by an axially extending ramp 64 which defines the radially inner side or floor of the entry. It will be noted that FIG. 3 illustrates the lubrication ring 50 as seen from the bottom and that the entry 62 opens into the sump 30 axially from the bottom and radially from the outer surface 51.

Near the deepest end of the ramp 64 is a lubricant passageway 56 which extends from the radially outer surface 51 of the ring to the radially inner surface 52. The passageway opening on the radially inner surface of the ring is aligned with the opening of a lubricant channel 72 in the radially outer surface of the stationary member 11. The channel comprises a series of bores 71, 73, and 75 which lead from the lubricant ring 50 to the annular space 45 and to the bearings 42 and 43.

The passageway 56 comprises a series of bores 57, 58 and 59. In a preferred embodiment the passageway 56 extends at an angle "X" of about 30° to the radial axis 65 of the ring, but this angle may vary in other designs. Bore 58 is cylindrically shaped while bores 57 and 59 are generally frustoconically shaped to provide an angularly stepped transition from the generally circumferentially extending entry to the generally radially extending lubricant path 71 in the stationary drive member 11. The inlet 55 also includes a plate-like projection 60 which, in a preferred embodiment, is welded to the outer surface 51 of the ring and is flush therewith. Alternatively, the projection 60 can be machined directly into the ring. The projection 60, along with the top radial guide wall 63 and bottom radial guide wall segment 63' form a box or chamber for guiding lubricant into the passageway 56 and 71.

In operation, lubricant such as oil is carried by the rotating "U" shaped drive member 20 with the lubricant sump 30. The lubricant rotates (in the direction of arrow 70 as shown in FIG. 3) relative to the stationary lubricant ring 50. The continuous ring has a hydrodynamic design to reduce drag and turbulence in sump 30, which increases efficiency of the lubrication system. Although centrifugal force due to rotation acts to throw lubricant in the sump radially outwardly, the flush inlets 55 act to scoop lubricant from the sump 30 into the ring 50 by the rotational forces in the lubricant.

Operation of the lubricant ring is further aided by the boundary layer principal, wherein lubricant forced into the inlets carries with it a continuous duct flow of lubricant.

For a more thorough understanding of the invention, it is necessary to understand the entire lubrication circulation system of the coupling. An external lubricant supply (not shown) is connected to the coupling through piping 80, which in turn is connected to a passageway 77 in the stationary member 11. The passageway 77 extends from the piping 80 to the lower portion of the sump 30. It should be noted that different cross-section lining in FIG. 2 indicates different planes of view. Cool lubricant is pumped from the supply to the sump underneath the lubrication ring 50. This cool lubricant replenishes the sump due to losses from lubricant overflow. Passage 77 also includes an anti-siphon vent 91.

Lubricant passing through the ring 50 travels through passageway 72 to the space 45, wherein it is forced both upwardly and downwardly between the member 40 and the bearings 41 and 43, respectively. The lubricant flowing downwardly passes under the member 11, upward through the sprags 14 and clutch 13 and returns to the sump 30. Lubricant flowing upwardly travels over the bearing shoulder 42 to passage 84 which is a return passage to the sump 30. Several passages such as 84 are provided around the coupling. Any excess lubrication is free to escape the lubrication system through the annular sump overflow space 90.

In the event of a stoppage of the external lubricant supply, lubricant will be supplied to the bearings 41 and 43 by the ring 50. Recirculation of the lubrication will therefore continue even without an external pump.

Although the foregoing structure has been described for the purpose of illustrating a presently preferred embodiment of the invention, it should be understood that many modifications or alterations may be made without departing from the spirit and the scope of the invention as set forth in the appended claims.

We claim:

1. A coupling comprising a first member adapted to be fixed against rotation, a rotatable member having an annular lubricant sump and unidirectional drive means adapted for engagement with said first member and said rotatable member, said first member having a ring extending into said sump, said ring having a radially outer surface and at least one lubrication passageway extending from said radially outer surface.

2. The coupling of claim 1 wherein said ring passageway comprises a flush inlet.

3. The coupling of claim 2 wherein said entry is defined by two intersecting walls, whereby said entry has a generally "L" shaped cross section, wherein one of said walls extends generally axially and the other of said walls extends generally radially.

4. The coupling of claim 2 wherein said ring comprises an entry extending generally circumferentially from said inlet.

5. The coupling of claim 4 wherein said entry opens to said sump radially and axially.

6. The coupling of claim 5 herein said ring has a bottom portion, wherein said axial opening is from said bottom portion.

7. The coupling of claim 1 wherein said lubrication passageway extends at an angle to the radial direction through said ring.

8. The coupling of claim 1 wherein said first member defines a lubrication channel and wherein said lubrication passageway extends to said lubrication channel.

9. The coupling of claim 8 further including a bearing between said first member and said rotatable member, wherein said lubrication channel extends to said bearing.

10. The coupling of claim 1 wherein said cylindrical unidirectional driving means comprises a plurality of sprags.

11. The coupling of claim 1 in combination with means exterior of said coupling for normally providing lubricant to said coupling.

12. The coupling of claim 1 wherein said rotatable member is generally "U" shaped and wherein said unidirectional driving means and said first member are at least partially surrounded by said rotatable member.

13. The coupling of claim 1 wherein said first member comprises gear teeth axially spaced from said unidirectional driving means and an holdback arm having gear teeth drivingly engaging said first member gear teeth.

14. The coupling of claim 1 wherein said first member includes a generally cylindrical radially outer portion for engagement with said unidirectional driving means and said rotatable member includes a generally cylindrical portion for engagement with said unidirectional driving means.

* * * * *